United States Patent
Bidkar et al.

(10) Patent No.: US 10,626,743 B2
(45) Date of Patent: Apr. 21, 2020

(54) SEGMENTED FACE SEAL ASSEMBLY AND AN ASSOCIATED METHOD THEREOF

(71) Applicant: General Electric Company, Schenectady, NY (US)

(72) Inventors: Rahul Anil Bidkar, Niskayuna, NY (US); Azam Mihir Thatte, Kensington, CA (US); Jifeng Wang, Niskayuna, NY (US); Xiaoqing Zheng, Niskayuna, NY (US); Edip Sevincer, Watervliet, NY (US)

(73) Assignee: General Electric Company, Schenectady, NY (US)

( * ) Notice: Subject to any disclaimer, the term of this patent is extended or adjusted under 35 U.S.C. 154(b) by 534 days.

(21) Appl. No.: 15/397,278

(22) Filed: Jan. 3, 2017

(65) Prior Publication Data
US 2018/0003067 A1 Jan. 4, 2018

Related U.S. Application Data

(60) Provisional application No. 62/357,097, filed on Jun. 30, 2016.

(51) Int. Cl.
*F01D 11/00* (2006.01)
*F16J 15/34* (2006.01)
(Continued)

(52) U.S. Cl.
CPC .............. *F01D 11/003* (2013.01); *F01D 5/02* (2013.01); *F01D 9/041* (2013.01); *F01D 25/16* (2013.01);
(Continued)

(58) Field of Classification Search
CPC .......... F01D 11/003; F01D 9/041; F01D 5/02; F01D 25/16; F16J 15/442; F05D 2220/32; F05D 2240/55
See application file for complete search history.

(56) References Cited

U.S. PATENT DOCUMENTS 3,033,577 A 5/1962 Hans
3,556,538 A 1/1971 Muller
(Continued)

FOREIGN PATENT DOCUMENTS

CN 201521433 U 7/2010
DE 2 134 964 A1 1/1972
(Continued)

OTHER PUBLICATIONS

Cheng et al., "Behavior of Hydrostatic and Hydrodynamic Noncontacting Face Seals", Journal of Lubrication Technology, vol. 90, Issue 2, Apr. 1, 1968, pp. 510-519.
(Continued)

*Primary Examiner* — Richard A Edgar
(74) *Attorney, Agent, or Firm* — Ann Agosti

(57) ABSTRACT

A turbomachine and a method of operating the turbomachine are disclosed. The turbomachine includes a stator, a rotor including a rotor bearing face, and a face seal assembly including a first segmented seal ring and a second segmented seal ring. The first segmented seal ring includes a plurality of joints and a first flat-contact surface and the second segmented seal ring includes a plurality of segment ends and a second flat-contact surface. One of the first and second segmented seal rings includes a seal bearing face. The second segmented seal ring is coupled to the first segmented seal ring such that the second flat-contact surface is in contact with the first flat-contact surface. The plurality of segment ends is circumferentially offset from the plurality of joints. The first segmented seal ring is slidably coupled to the stator and defines a face seal clearance between the rotor and seal bearing faces.

24 Claims, 10 Drawing Sheets

(51) Int. Cl.
*F01D 5/02* (2006.01)
*F01D 9/04* (2006.01)
*F01D 25/16* (2006.01)
*F16J 15/44* (2006.01)

(52) U.S. Cl.
CPC ......... *F16J 15/3488* (2013.01); *F16J 15/442* (2013.01); *F05D 2220/32* (2013.01); *F05D 2230/60* (2013.01); *F05D 2240/55* (2013.01)

(56) References Cited

U.S. PATENT DOCUMENTS

| | | | |
|---|---|---|---|
| 3,572,727 A | 3/1971 | Greiner | |
| 3,804,424 A | 4/1974 | Gardner | |
| 3,926,442 A | 12/1975 | Muller | |
| 4,212,475 A | 7/1980 | Sedy | |
| 4,523,764 A | 6/1985 | Albers et al. | |
| 4,738,453 A | 4/1988 | Ide | |
| 4,768,790 A | 9/1988 | Netzel et al. | |
| 5,052,694 A | 10/1991 | Lipschitz | |
| 5,067,733 A | 11/1991 | Nagai et al. | |
| 5,090,712 A | 2/1992 | Pecht et al. | |
| 5,143,384 A | 9/1992 | Lipschitz | |
| 5,172,918 A | 12/1992 | Pecht et al. | |
| 5,180,173 A | 1/1993 | Kimura et al. | |
| 5,201,531 A | 4/1993 | Lai | |
| 5,222,743 A | 6/1993 | Goldswain et al. | |
| 5,224,714 A | 7/1993 | Kimura et al. | |
| 5,398,943 A | 3/1995 | Shimizu et al. | |
| 5,441,283 A | 8/1995 | Pecht et al. | |
| 5,454,572 A | 10/1995 | Pospisil | |
| 5,496,047 A | 3/1996 | Goldswain et al. | |
| 5,501,470 A | 3/1996 | Fuse et al. | |
| 5,531,458 A | 7/1996 | Sedy | |
| 5,533,739 A | 7/1996 | Sedy | |
| 5,538,649 A | 7/1996 | Demendi et al. | |
| 5,560,622 A | 10/1996 | Sedy | |
| 5,609,342 A | 3/1997 | Peterson et al. | |
| 5,664,787 A | 9/1997 | Fuse et al. | |
| 5,681,047 A | 10/1997 | Klostermann et al. | |
| 5,700,013 A | 12/1997 | Baty | |
| 5,702,110 A | 12/1997 | Sedy | |
| 5,722,665 A | 3/1998 | Sedy et al. | |
| 6,076,830 A | 6/2000 | Wu et al. | |
| 6,131,912 A | 10/2000 | Azibert et al. | |
| 6,135,458 A | 10/2000 | Fuse | |
| 6,142,478 A | 11/2000 | Pecht et al. | |
| 6,145,843 A | 11/2000 | Hwang | |
| 6,293,555 B1 | 9/2001 | Sedy | |
| 6,299,173 B1 | 10/2001 | Lai | |
| 6,446,976 B1 | 9/2002 | Key | |
| 6,726,213 B2 | 4/2004 | Wang | |
| 7,240,904 B2 | 7/2007 | Droscher et al. | |
| 7,377,518 B2 | 5/2008 | Lai | |
| 8,100,403 B2 | 1/2012 | Short | |
| 8,814,433 B2 | 8/2014 | Tokunaga | |
| 2007/0007730 A1 | 1/2007 | Garrison et al. | |
| 2009/0060408 A1 | 3/2009 | Nagasaka et al. | |
| 2014/0086741 A1 | 3/2014 | Ullah | |
| 2014/0117625 A1 | 5/2014 | Short et al. | |
| 2014/0203517 A1 | 7/2014 | Ferris et al. | |
| 2014/0265146 A1 | 9/2014 | Danaher | |
| 2015/0132116 A1 | 5/2015 | Zheng et al. | |
| 2015/0275684 A1 | 10/2015 | Thatte et al. | |
| 2016/0010480 A1 | 1/2016 | Bidkar et al. | |
| 2016/0265375 A1* | 9/2016 | Maret | F01D 11/003 |

FOREIGN PATENT DOCUMENTS

| | | |
|---|---|---|
| EP | 2 025 875 A2 | 2/2009 |
| EP | 2 233 700 A1 | 9/2010 |
| GB | 2 459 016 A | 10/2009 |
| WO | 1995006211 A1 | 3/1995 |

OTHER PUBLICATIONS

J F Gardner, "Hydrostatic and hydrodynamic Non-Contacting Face Seals," Triboloy, vol. 3, Issue 2, May 1970, pp. 98-99.

C G Floyd, "Gas seals for rotating shafts", Tribology International, , Aug. 1986, vol. 19, Issue 4, pp. 204-211.

Lai T, "Development of non-contacting, non-leaking spiral groove liquid face seals", SciTech Connect, Lubrication Engineering, vol. 50; Issue: 8, Aug. 1994, pp. 625-631.

Jason Marquardt, "Successful Operational Experience Sealing Supercritical $CO_2$," In Supercritical $CO_2$ power cycle symposium, http://www.sco2powercyclesymposium.org/resource_center/turbomachinery/successful-operational-experience-sealing-supercritical-co2, 2011, 35 Pages.

Mayer, E., Mechanical Seals. Newnes-Butterworth, 1977, p. 9 of 291.

International Search Report and Written Opinion issued in connection with corresponding PCT Application No. PCT/US2017/40072 dated Oct. 13, 2017.

* cited by examiner

SEGMENTED FACE SEAL ASSEMBLY AND AN ASSOCIATED METHOD THEREOF

CROSS REFERENCE TO RELATED APPLICATIONS

This patent application claims priority and benefit under 35 U.S.C. §119(e) from U.S. Provisional Application No. 62/357,097 (GE DOCKET NO. 311426-1) entitled "SEGMENTED FACE SEAL ASSEMBLY AND AN ASSOCIATED METHOD THEREOF", filed on Jun. 30, 2016, which is incorporated by reference herein in its entirety.

This invention was made with Government support under contract number DE-FE0024007 awarded by U.S. Department of Energy. The Government has certain rights in the invention.

BACKGROUND

The present disclosure relates generally to a turbomachine, and, more particularly, to a face seal assembly having segmented seal rings and a method of assembling the segmented seal rings in the turbomachine.

Turbomachines generally include compressors, turbines, and a rotor, such as, a shaft or a drum, which support turbomachine blades. For example, the turbomachine blades may be arranged in stages along the rotor of the turbomachine. The turbomachine may further include various seals to reduce a leakage flow of a process fluid between various components of the turbomachine. For example, the turbomachine may include a face seal assembly configured to reduce the leakage flow of the process fluid between the shaft (e.g., rotating shaft) and a housing of the turbomachine. Typically, such a face seal assembly includes a stationary ring disposed over the shaft and coupled to the housing for regulating the leakage flow. However, assembling the stationary ring over a large-sized rotor is difficult due to interference between the stationary ring and other rotor components, such as large-sized end couplings, and the like. Other type of a face seal assembly includes a stationary ring formed by assembling two segmented rings as opposed to a continuous 360-degree or non-segmented stationary ring. The face seal assembly having the segmented rings may be easily assembled over the rotor. However, the face seal assembly having the segmented stationary ring produces an axial step along a seal bearing face at an interface between the two segmented rings. Further, the assembled stationary ring may have a substantially low rigidity compared to the continuous 360-degree stationary ring having the same cross-section. Also, the face seal assembly employing the segmented rings is susceptible to deformation, resulting in premature wear of the seal bearing face and performance degradation of the face seal assembly.

Accordingly, there is a need for an enhanced segmented face seal assembly for a turbomachine and an associated method for assembling such a segmented face seal assembly.

BRIEF DESCRIPTION

In accordance with one embodiment, a turbomachine is disclosed. In accordance with aspects of the present technique, the turbomachine includes a stator, a rotor, and a face seal assembly. The rotor includes a rotor bearing face. The face seal assembly includes a first segmented seal ring and a second segmented seal ring. The first segmented seal ring includes a plurality of joints and a first flat-contact surface and the second segmented seal ring includes a plurality of segment ends and a second flat-contact surface. One of the first segmented seal ring and the second segmented seal ring includes a seal bearing face. The second segmented seal ring is coupled to the first segmented seal ring such that the second flat-contact surface is in contact with the first flat-contact surface. The plurality of segment ends is circumferentially offset from the plurality of joints. The first segmented seal ring is slidably coupled to the stator and defines a face seal clearance between the rotor bearing face and the seal bearing face.

In accordance with another embodiment, a method of assembling a face seal assembly is disclosed. In accordance with aspects of the present technique, the method includes obtaining a first segmented seal ring including a plurality of joints and a first flat-contact surface. Further, the method includes obtaining a second segmented seal ring including a plurality of segment ends and a second flat-contact surface. One of the first segmented seal ring and the second segmented seal ring includes a seal bearing face. The method further includes assembling segments of the first segmented seal ring on a rotor of a turbomachine. Further, the method includes slidably coupling the first segmented seal ring to a stator of the turbomachine to define a face seal clearance between the seal bearing face and a rotor bearing face of a rotor of the turbomachine. The method further includes assembling segments of the second segmented seal ring on the first segmented seal ring such that the plurality of segment ends is circumferentially offset from the plurality of joints. Further, the method includes coupling the second segmented seal ring to the first segmented seal ring such that the second flat-contact surface is in contact with the first flat-contact surface.

DRAWINGS

These and other features and aspects of embodiments of the present technique will become better understood when the following detailed description is read with reference to the accompanying drawings in which like characters represent like parts throughout the drawings, wherein.

DETAILED DESCRIPTION

Figure 1:
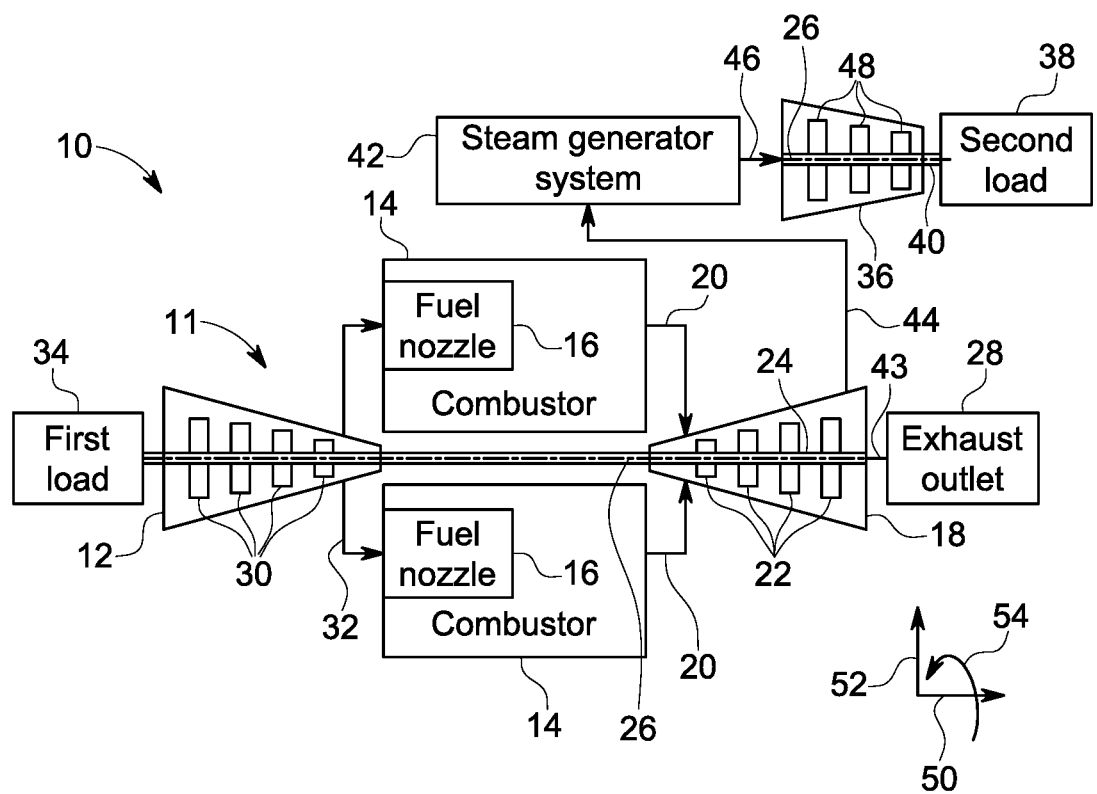
FIG. 1 is a schematic diagram of an embodiment of a combined cycle power generation system having a gas turbine system, a steam generator system, and a steam turbine, in accordance with aspects of the present technique.

Embodiments discussed herein disclose a face seal assembly for use in a turbomachine, such as, but not limited to, a gas turbine, a steam turbine, a supercritical carbon dioxide turbine, and a hydro turbine. In some other embodiments, the face seal assembly may be used in a large-scale carbon dioxide ($CO_2$) production system, a compressor, an aircraft engine, and the like. In certain embodiments, the turbomachine includes a stator, a rotor, and the face seal assembly. The rotor includes a rotor bearing face. In such embodiments, the face seal assembly includes a first segmented seal ring and a second segmented seal ring. The first segmented seal ring includes a plurality of joints and a first flat-contact surface. The second segmented seal ring includes a plurality of segment ends and a second flat-contact surface. One of the first segmented seal ring and the second segmented seal ring includes a seal bearing face. The second segmented seal ring is coupled to the first segmented seal ring such that the second flat-contact surface is in contact with the first flat-contact surface. The plurality of segmented ends is circumferentially offset from the plurality of joints. Further, the first segmented seal ring is slidably coupled to the stator and defines a face seal clearance between the rotor bearing face and the seal bearing face. As used herein, the term "face seal clearance" may also be referred to as a "rotor-stator gap".

In one or more embodiments, the face seal assembly of the present disclosure may be referred to as a "hydrodynamic face seal assembly" or a "hydrostatic face seal assembly" or combinations thereof. In some embodiments, the hydrodynamic face seal assembly includes a plurality of hydrodynamic elements disposed on one of the seal bearing face and the rotor bearing face. The plurality of hydrodynamic elements is configured to generate a separating force along the face seal clearance upon rotation of the rotor, thereby producing a fluid-film between the seal bearing face and the rotor bearing face. In some other embodiments, the hydrostatic face seal assembly may include a cavity and a plurality of isolated hydrostatic ports extending from the cavity to the seal bearing face. Each isolated port is configured to inject a pressurized fluid against the rotor bearing face to generate a separating force along the face seal clearance. In certain embodiments, such a hydrodynamic face seal and a hydrostatic face seal may be configured to lift-off the seal bearing face by generating the separating force and thereby produce a fluid-film there between the seal bearing face and the rotor bearing face.

In certain embodiments, the first and second segmented seal rings are assembled to form the face seal ring assembly. In one or more embodiments, the ability to in-situ assemble split segments of the first and second segmented seal rings allows usage of such a face seal assembly for a large-scale turbine, where a traditional non-split seal ring (or a 360-degree seal ring) may not be assembled due to interference with other components, such as large-diameter end couplings disposed on the large-scale turbine rotor. The seal bearing face assembled from at least two segments of the first and second segmented seal rings, may inherently have an axial step on the seal bearing face at a joining interface between the at least two segments. The axial step on the seal bearing face may be a result of inaccurate machining of the first and second segmented seal rings, and imperfections introduced during assembling the segments of the first and seal segmented seal rings. To ensure a reliable operation of the face seal assembly, it is desirable that a thickness of the axial step on the seal bearing face is significantly smaller than a thickness of the face seal clearance. The present specification herein provides a face seal assembly and a method for machining and/or assembling such a face seal assembly to overcome the axial step introduced during machining and/or assembling of the at least two segments of the first and second segmented seal rings.

In one or more embodiments, machining a first flat-contact surface (i.e., mating face) of the first seal ring and machining a second flat-contact surface (i.e., an opposing mating face) of the second segmented seal ring provides a controlled flat surface to the respective segmented seal rings, which facilitates the split segments to reduce the axial step along the seal bearing face of the face seal assembly. Further, during in-situ assembly of the face seal assembly, the first segmented seal ring having a plurality of joints is circumferentially offset from the second segmented seal ring having a plurality of segment ends to minimize the axial step along the seal bearing face. In some embodiments, adjusting the circumferential offset is also referred as "clocking" of the joints and segment ends. Further, in the circumferentially offset position, the second segmented seal ring is coupled to the first segmented seal ring to minimize the axial step along the seal bearing face. In certain embodiments, corresponding ends of the plurality of joints is reinforced/clamped with a coupling device of a plurality of coupling devices to increase rigidity of the face seal assembly and to reduce deformation of the first segmented seal ring.

FIG. 1 shows a schematic diagram of an embodiment of a combined cycle system 10 in accordance with one exemplary embodiment of the present technique. The combined cycle system 10 includes various turbomachines in which a face seal assembly of the present technique may be used. Specifically, such turbomachines may include the face seal assembly including a first segmented seal ring and a second segmented seal ring coupled to the first segmented seal ring such that a first flat-contact surface of the first segmented seal ring is in contact with a second flat-contact surface of the second segmented seal ring. As illustrated in the embodiment of FIG. 1, the combined cycle system 10 includes a gas turbine system 11 having a compressor 12, combustors 14 having fuel nozzles 16, and a gas turbine 18. In the illustrated embodiment, the compressor 12 includes compressor blades 30 which are coupled to a rotor 24.

The compressor blades 30 are driven by the rotor 24 of the gas turbine 18, to compress air to generate pressurized air 32 and further to rout the pressurized air 32 to the combustors 14. In certain embodiments, the compressor 12 may include a face seal assembly (not shown in FIG. 1) configured to regulate undesired leakage of the pressurized air 32 across a rotor-stator gap (i.e. a face seal clearance) within the compressor 12. The fuel nozzles 16 inject a liquid fuel and/or gas fuel, such as natural gas or syngas, into the combustors 14, where such a fuel is mixed with the pressurized air 32 to generate a fuel-air mixture. The combustors 14 ignite and combust the fuel-air mixture, and then route an exhaust gas 20 into the gas turbine 18 having turbine blades 22 coupled to the rotor 24. As illustrated, the rotor 24 is also coupled to the compressor 12. As the exhaust gas 20 flows through the turbine blades 22, the rotor 24 is rotated along a central line axis 26 of the combined cycle system 10. In certain embodiments, the gas turbine 18 may also include the face seal assembly configured to regulate undesired leakage of the exhaust gas 20 across a face seal clearance within the gas turbine 18. The rotor 24 is also coupled to a first load 34 to generate power. The first load 34 may include an electrical generator, a propeller of an airplane, and the like.

The combined cycle system 10 further includes a steam turbine 36 and a steam generator system 42. The gas turbine 18 is coupled to the steam generator system 42 and an exhaust outlet 28, while the steam generator system 42 is coupled to the steam turbine 36. A portion 43 of the exhaust gas 20 exits the gas turbine 18 via the exhaust outlet 28. Another portion 44 of the exhaust gas 20 is transported from the gas turbine 18 to the steam generator system 42 to heat water and produce steam 46. The steam 46 produced by the steam generator system 42 flows through turbine blades 48 of the steam turbine 36. As the steam 46 flow through the turbine blades 48, a rotor 40 is rotated, thereby powering a second load 38, such as, an electrical generator. In certain embodiments, the steam turbine 36 may also include the face seal assembly to regulate undesired leakage of steam 46 across a face seal clearance within the steam turbine 36.

In the following discussion, reference may be made to various directions or axes, such as, an axial direction 50 along the central line axis 26, a radial direction 52 away from the central line axis 26, and a circumferential direction 54 around the central line axis 26 of the compressor 12, the gas turbine 18, the steam turbine 36, or the face seal assembly. Additionally, as mentioned above, while the face seal assembly described hereinafter may be used with a variety of other turbomachines (e.g., supercritical $CO_2$, aircraft engines, and the like) the following discussion describes an enhanced face seal assembly in the context of the steam turbine 36 and such an embodiment should not be construed as a limitation of the present technique.

Figure 2:
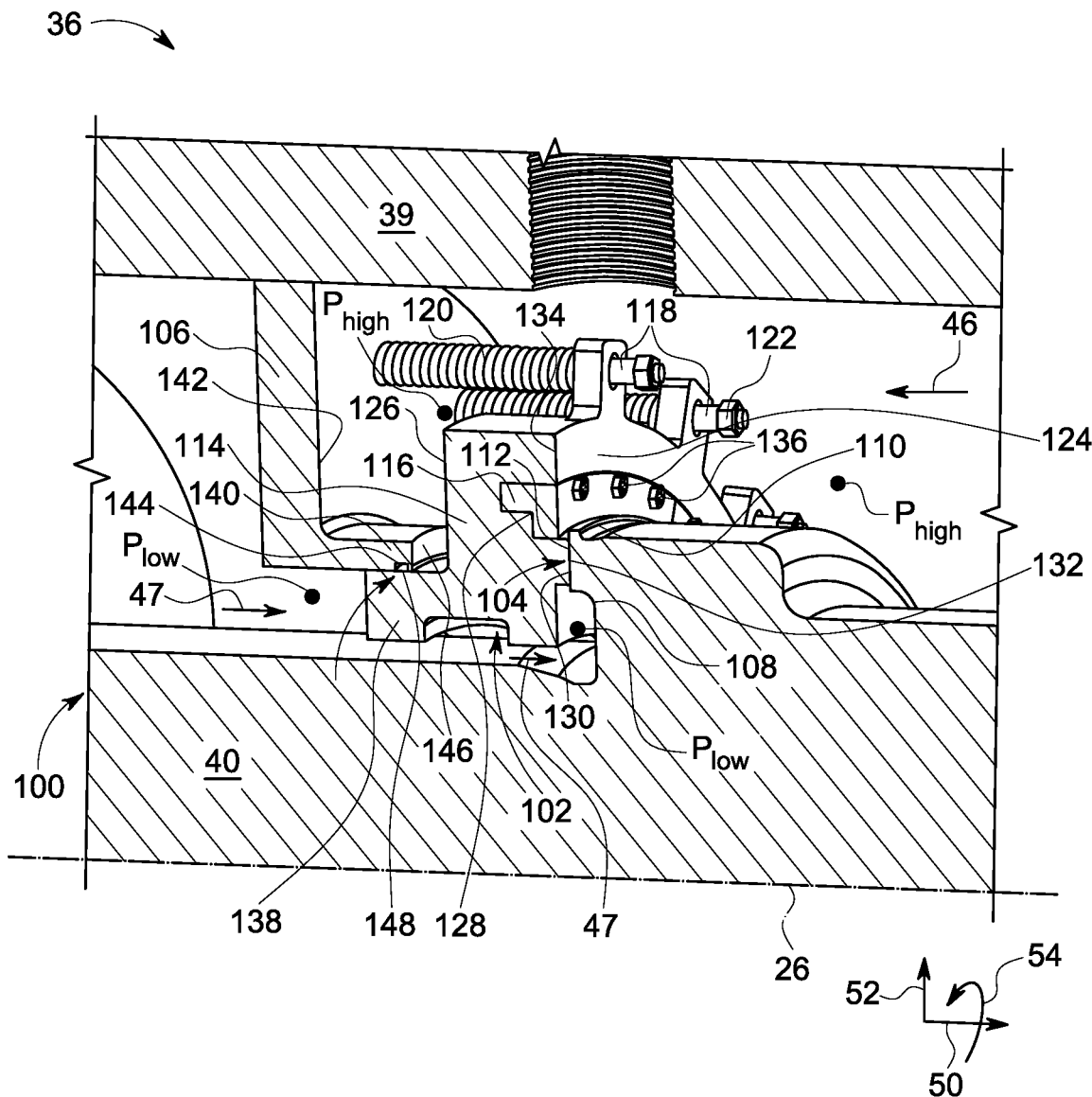
FIG. 2 is a schematic sectional view of a portion of a steam turbine including a stator, a rotor, and a face seal assembly, in accordance with aspects of the present technique.

FIG. 2 shows a schematic sectional view of a portion 100 of a steam turbine 36 in accordance with one exemplary embodiment of the present technique. The steam turbine 36 includes a stator 39, a rotor 40, and a face seal assembly 102. In one embodiment, the stator 39 is a casing of the steam turbine 36 and the rotor 40 is a shaft of the steam turbine 36. In one embodiment, the face seal assembly 102 is disposed between the stator 39 and the rotor 40 such that a face seal clearance 104 (hereinafter also referred to as a "primary seal clearance") is established between the face seal assembly 102 and the rotor 40. In one embodiment, the portion 100 corresponds to an end packing area of the steam turbine 36. As used herein, the term "end packing" refers to a downstream end of the rotor 40, where the face seal assembly 102 acts as an interface between the rotor 40 and the stator 39.

The steam turbine 36 further includes a stator adaptor 106 coupled to the stator 39. In certain embodiments, the stator adaptor 106 extends along the circumferential direction 54 of the steam turbine 36. In the illustrated embodiment, the stator adaptor 106 has an L-shaped sectional profile. The stator 39 extends along the axial direction 50. The rotor 40 includes an extended section 108 protruding along the radial direction 52 and a rotor ring 110 coupled to an end portion of the extended section 108. In such an embodiment, the rotor ring 110 includes a rotor bearing face 112. In some other embodiments, the rotor 40 includes the rotor bearing face 112 extending circumferentially along the extended section 108. In one embodiment, the rotor bearing face 112 may include a plurality of hydrodynamic elements (not shown in FIG. 2) disposed along the circumferential direction 54 of the face seal assembly 102.

The face seal assembly 102 includes a first segmented seal ring 114 and a second segmented seal ring 116. It should be noted herein that FIG. 2 illustrates only a portion of the first and second segmented seal rings 114, 116. The first segmented seal ring 114 includes a first peripheral side 124, a second peripheral side 126, a plurality of joints (not shown in FIG. 2), and a circumferential slot 128. In one embodiment, the first segmented seal ring 114 further includes a seal bearing face 132 and a first flat-contact surface (not labeled in FIG. 2). In the illustrated embodiment, the seal bearing face 132 is disposed along a portion 130 of the first peripheral side 124 and faces the rotor bearing face 112 to define the face seal clearance 104 between the rotor bearing face 112 and the seal bearing face 132. In one embodiment, the seal bearing face 132 includes a plurality of hydrodynamic elements (not shown in FIG. 2) spaced apart from each and disposed along the circumferential direction 54 of the face seal assembly 102. The circumferential slot 128 is disposed on another portion 134 of the first peripheral side 124 such that the circumferential slot 128 extends from the first peripheral side 124 towards the second peripheral side 126. In the illustrated embodiment, the circumferential slot 128 has an L-shaped sectional profile.

The second segmented seal ring 116 includes a plurality of segment ends (not shown in FIG. 2) and a second flat-contact surface (not labeled in FIG. 2). In one embodiment, the second segmented seal ring 116 is disposed at least partly within the circumferential slot 128 defined by the first segmented seal ring 114 and coupled to the first segmented seal ring 114 via a plurality of coupling members 136. In one embodiment, each of the plurality of coupling members 136 is an axial bolt. In one embodiment, the second segmented ring 116 has a complementary profile to that of the circumferential slot 128, such that the second segmented seal ring 116 may be easily disposed within the circumferential slot 128. In the illustrated embodiment, the second segmented ring 116 has an L-shaped sectional profile.

The first segmented seal ring 114 is slidably coupled to the stator 39 and defines the face seal clearance 104 between the rotor bearing face 112 and the seal bearing face 132. The first segmented seal ring 114 further includes an end portion 138 extending away from the seal bearing face 132. Similarly, the stator adaptor 106 includes an end portion 140 extending towards the seal bearing face 132 and a groove 144 formed in the end portion 140. In such an embodiment, the end portion 140 and the groove 144 of the stator adaptor 106 are configured to face the end portion 138 of the first segmented seal ring 114. In one or more embodiments, the face seal assembly 102 further includes a secondary seal 148 (not shown in FIG. 2) disposed between the end portions 138, 140. Specifically, the secondary seal 148 is disposed within the groove 144 such that the secondary seal 148 is in contact with the end portions 138, 140 and configured to provide a sliding interface for the face seal assembly 102. The secondary seal 148 may include a metallic or non-metallic material. In one embodiment, the secondary seal 148 is an O-ring. In certain embodiments, the secondary seal 148 is a C-seal and the like.

The steam turbine 36 further includes a high-pressure cavity "$P_{high}$" having a flow of a steam 46 (i.e., a process fluid) at a high-pressure and a low-pressure cavity "$P_{low}$" having a flow of a leakage fluid 47 at a low-pressure. The high-pressure cavity "$P_{high}$" and the low-pressure cavity "$P_{low}$" are defined by the stator 39, the rotor 40, and the face seal assembly 102. It should be noted herein that the high-pressure cavity "$P_{high}$" and the low-pressure cavity "$P_{low}$" may also be referred to as a "seal upstream cavity"

and a "seal downstream cavity" respectively. In certain embodiments, the low-pressure cavity "$P_{low}$" is disposed downstream of the high-pressure cavity "$P_{high}$" with reference to the flow of the steam 46 along the stator 39 and the rotor 40.

In one embodiment, the stator adaptor 106 further includes a plurality of axial guides 118 disposed along the circumferential direction 54 of the steam turbine 36. Each of the plurality of axial guides 118 includes a biasing member 120 coupled to the first segmented seal ring 114 and the stator adaptor 106. The plurality of axial guides 118 and the biasing member 120 are configured to allow movement of the face seal assembly 102 along the axial direction 50 and prevent the movement of the face seal assembly 102 along the circumferential direction 54 of the face seal assembly 102. Further, each of the plurality of axial guides 118 includes a stopper 122 disposed at an end portion of the corresponding axial guide 118 to restrict an axial movement of the face seal assembly 102 beyond a pre-determined limit along the axial direction 50 of face seal assembly 102. In the illustrated embodiment, the biasing member 120 is a helical spring.

In certain embodiments, the first segmented seal ring 114 is made of a first material and the second segmented seal ring 116 is made of a second material. In some embodiments, the first and the second material are same. In some other embodiments, the first and second materials are different. In certain embodiments, the first and second materials may deform differently under thermal load conditions, thereby allowing to control or optimize deformation of the seal bearing face 132 during such thermal load conditions. In certain embodiments, the first and the second materials may include carbon-based steel materials or stainless steel materials or high-temperature nickel-based alloy materials or ceramic materials. In one or more embodiments, the nickel-based alloy materials may include Inconel 718, Haynes 282, and the like and the ceramic material may include silicon carbide, tungsten carbide, and the like. In certain embodiments, the rotor bearing face 112 and/or the seal bearing face 132 may have a substantially thin coating which may be made of wear-resistant coating materials, such as, NASA PS 400 or Diamond-Like Carbon (DLC). The substantially thin coating may ensure reduced wear of the rotor bearing face 112 and/or the seal bearing face 132 during start-up rubs and accidental rubs.

Figure 3:
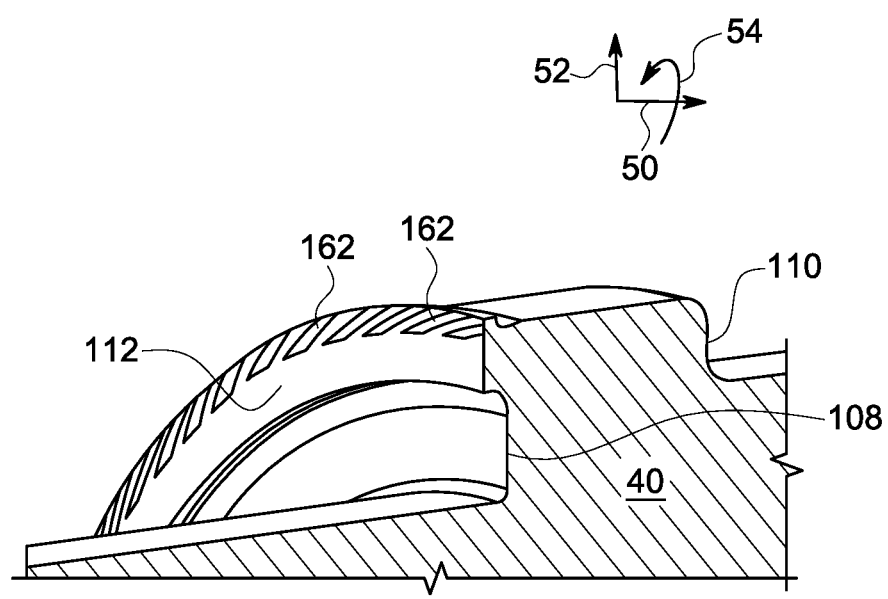
FIG. 3 is a schematic sectional view of a portion of the rotor of FIG. 2, in accordance with aspects of the present technique.

During operation, the rotor 40 is rotated due to a flow of the steam 46 through the turbine blades 48 (as shown in FIG. 1) of the steam turbine 36. The plurality of biasing members 120 and the steam 46 at the high-pressure cavity "$P_{high}$" may generate a first force on the face seal assembly 102 to move the seal bearing face 132 along the axial direction 50 towards the rotor bearing face 112. In certain embodiments, the first force may be referred as a "closing force". Upon rotation of the rotor 40, the plurality of hydrodynamic elements (as shown in FIG. 3) formed on the rotor bearing face 112 may generate a second force to move (i.e., lift-off) the seal bearing face 132 away from the rotor bearing face 112 along the axial direction 50 and generate a fluid-film (not shown) along the face seal clearance 104. In certain embodiments, the second force is also referred as a "separating force". In other words, the fluid film is established in the face seal clearance 104 to prevent the seal bearing face 132 contacting the rotor bearing face 112. The face seal assembly 102 may attain an equilibrium clearance between the seal bearing face 132 and the rotor bearing face 112 based on a balance of the closing and separating forces. A portion of the steam 46 may leak through the face seal clearance 104 from the higher-pressure cavity "$P_{high}$" to the lower-pressure cavity "$P_{low}$". Further, in operation, the face seal assembly 102 may be subjected to continuous or intermittent movement of the rotor bearing face 112 towards the seal bearing face 132. However, the fluid film has a high stiffness and ensures that the face seal assembly 102 successfully tracks the axial motion of the rotor 40 without rubbing the face seal assembly 102 against the rotor 40. Thus, the fluid-film regulates the leakage flow of the steam 46 from the high-pressure cavity "$P_{high}$" to the low-pressure cavity "$P_{low}$" through the face seal clearance 104. Similarly, the secondary seal 148 regulates the leakage flow of the steam 46 from the high-pressure cavity "$P_{high}$" to the low-pressure cavity "$P_{low}$" there between the end portions 138, 140.

FIG. 3 shows a schematic sectional view of a rotor 40 in accordance with one exemplary embodiment of the present technique. The rotor 40 includes an extended section 108 protruding along a radial direction 52 and a rotor ring 110 coupled to an end portion of the extended section 108. In such an embodiment, the rotor ring 110 includes a rotor bearing face 112. In one embodiment, the rotor bearing face 112 includes a plurality of hydrodynamic elements 162 disposed spaced apart from each other along a circumferential direction 54. In the illustrated embodiment, the plurality of hydrodynamic elements 162 includes spiral grooves. In some other embodiments, the plurality of hydrodynamic elements 162 may be Rayleigh steps and the like. In one or more embodiments, upon rotation of the rotor 40, the plurality of hydrodynamic elements 162 is configured to a produce a fluid-film (not shown) between the rotor bearing face 112 and a seal bearing face 132 (as shown in FIG. 2).

Figure 4:
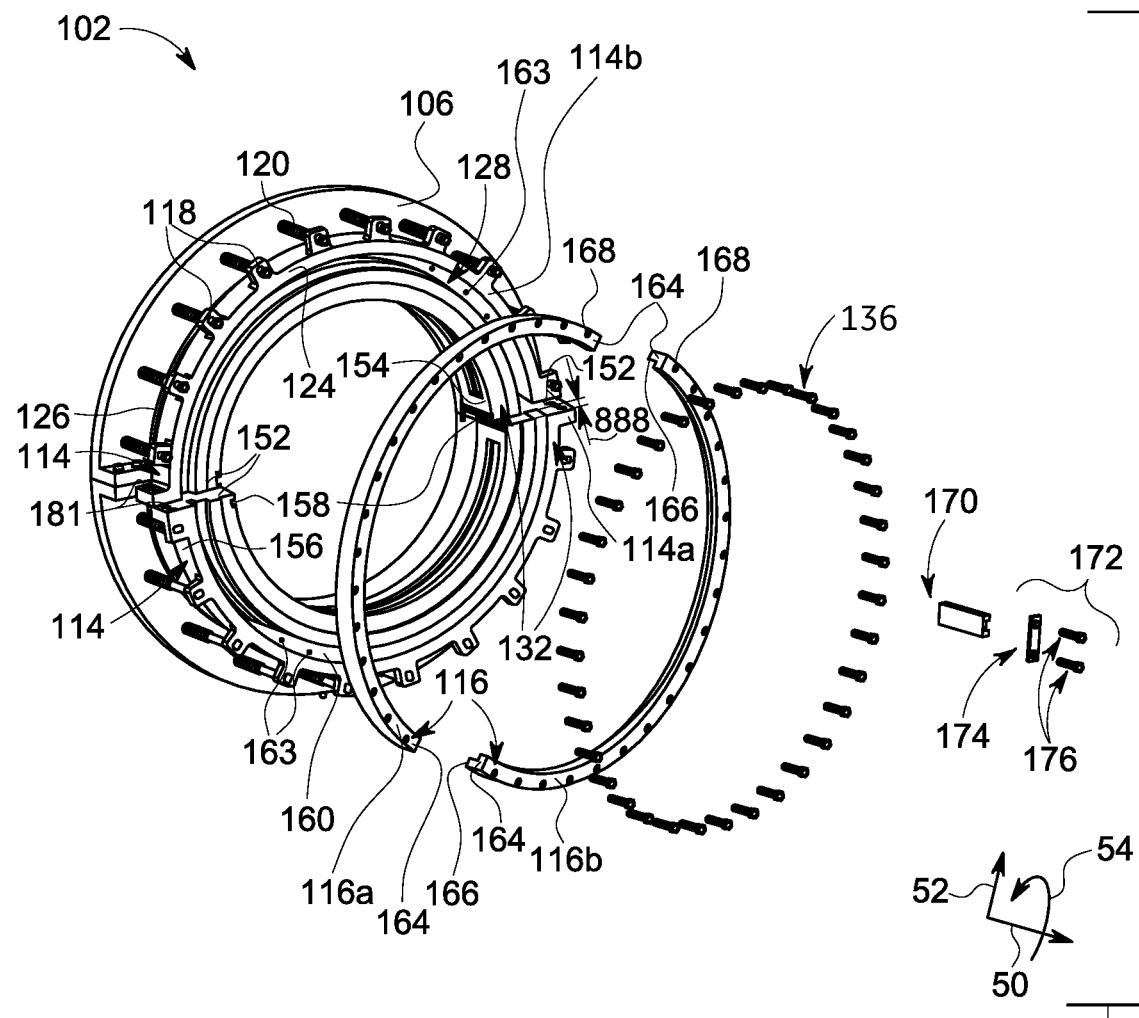
FIG. 4 is an exploded perspective view of a face seal assembly and a stator adaptor of FIG. 2, in accordance with aspects of the present technique.

FIG. 4 shows an exploded perspective view of the face seal assembly 102 of FIG. 2 in accordance with one exemplary embodiment of the present technique. In certain embodiments of the present technique, the face seal assembly 102 includes a first segmented seal ring 114 and a second segmented seal ring 116.

In one embodiment, the first segmented seal ring 114 has a split configuration. More particularly, the first segmented seal ring 114 may include two or more circumferentially split or divided segments that cooperatively form the first segmented seal ring 114. In the illustrated embodiment, the first segmented seal ring 114 includes two first segments 114a, 114b. As discussed in FIG. 2, the first segmented seal ring 114 further includes the first peripheral side 124, the second peripheral side 126, the circumferential slot 128, and the seal bearing face 132. Further, the first segmented seal ring 114 includes a plurality of joints 152 configured to join the two first segments 114a, 114b of the first segmented seal ring 114, to each other. Further, each of the plurality of joints 152 includes a first side portion 154 and a second side portion 156, where at least one of the first side portion 154 and the second side portion 156 includes a plurality of slots 158. In the illustrated embodiment, the first side portion 154 includes the plurality of slots 158, for example, a plurality of dovetail slots although other types of slots other than the dovetail slots may also be used. In one embodiment, the circumferential slot 128 includes a first flat-contact surface 160 (i.e., the mating face) 160 having a flat surface. In the illustrated embodiment, the mating face 160 extends along the radial direction 52 of the steam turbine and is nominally perpendicular to the axial direction 50 of the steam turbine. Further, the mating face 160 includes a plurality of first grooves 163 disposed along the circumferential direction 56 of the steam turbine. In certain embodiments, each of the plurality of first grooves 163 is a threaded hole.

The second segmented seal ring 116 has a split configuration. More particularly, the second segmented seal ring 116 may include two or more circumferentially split or divided segments that cooperatively form the second segmented seal ring 116. In the illustrated embodiment, the second segmented seal ring 116 includes two second segments 116a, 116b. The second segmented seal ring 116 includes a plurality of segment ends 164 that form the circumferential ends of second segments 116a, 116b of the second segmented seal ring 116. In certain embodiments, upon assembly of the first and second segmented seal rings 114, 116 the segment ends 164 of the second segments 116a and 116b may be in physical contact with one another. The second segmented seal ring 116 further includes a second flat-contact surface 166 (i.e., an opposing mating face) having a flat surface. In the illustrated embodiment, the opposing mating face 166 extends along the radial direction 52 of the steam turbine and is nominally perpendicular to the axial direction 50 of the steam turbine. Further, the opposing mating face 166 includes a plurality of second grooves 168 disposed along the circumferential direction 56 of the steam turbine. In certain embodiments, each of the plurality of second grooves 168 is a through-hole. In one or more embodiments, the second segmented seal ring 116 is configured to be disposed at least partly within the circumferential slot 128 defined by the first segmented seal ring 114.

In one embodiment, the steam turbine 36 further includes a plurality of clamps 170 and a plurality of coupling members 172. It should be noted herein that only one clamp of the plurality of clamps 170 is shown in the embodiment of FIG. 4. In the illustrated embodiment, each of the plurality of clamps 170 is a dovetail clamp, although other type of clamps other than the dovetail clamp may also be used. In one or more embodiments, each of the plurality of clamps 170 is configured to fasten to the plurality of slots 158 to retain joining ends of each of the plurality of joints 152. The plurality of coupling members 172 includes a plurality of retaining plates 174 and a plurality of retaining bolts 176. It should be noted herein that only one retaining plate of the plurality of retaining plates 174 is shown in the embodiment of FIG. 4. The plurality of retaining plates 174 and plurality of retaining bolts 176 are used to further reinforce the plurality of joints 152 by forming a bolted connection between the two first segments 114a, 114b. The plurality of retaining plates 174 may also prevent an unintentional dislodgement of the plurality of clamps 170 after assembling the two first segments 114a, 114b. The plurality of retaining bolts 176 is used for securing the corresponding retaining plate 174 to the individual segments 114a, 114b. In one or more embodiments, the plurality of slots 158, the plurality of clamps 170, and the plurality of coupling members 172 are collectively referred as a plurality of coupling devices. It should be noted herein that the plurality of clamps 170 and coupling members 172 are used for coupling the two first segments 114a, 114b on the first side portion 154 of the first segmented seal ring 114. Although not illustrated in FIG. 4, a similar coupling may be used for coupling the two first segments 114a, 114b on the second side portion 156 of the first segmented seal ring 114.

Figure 5:
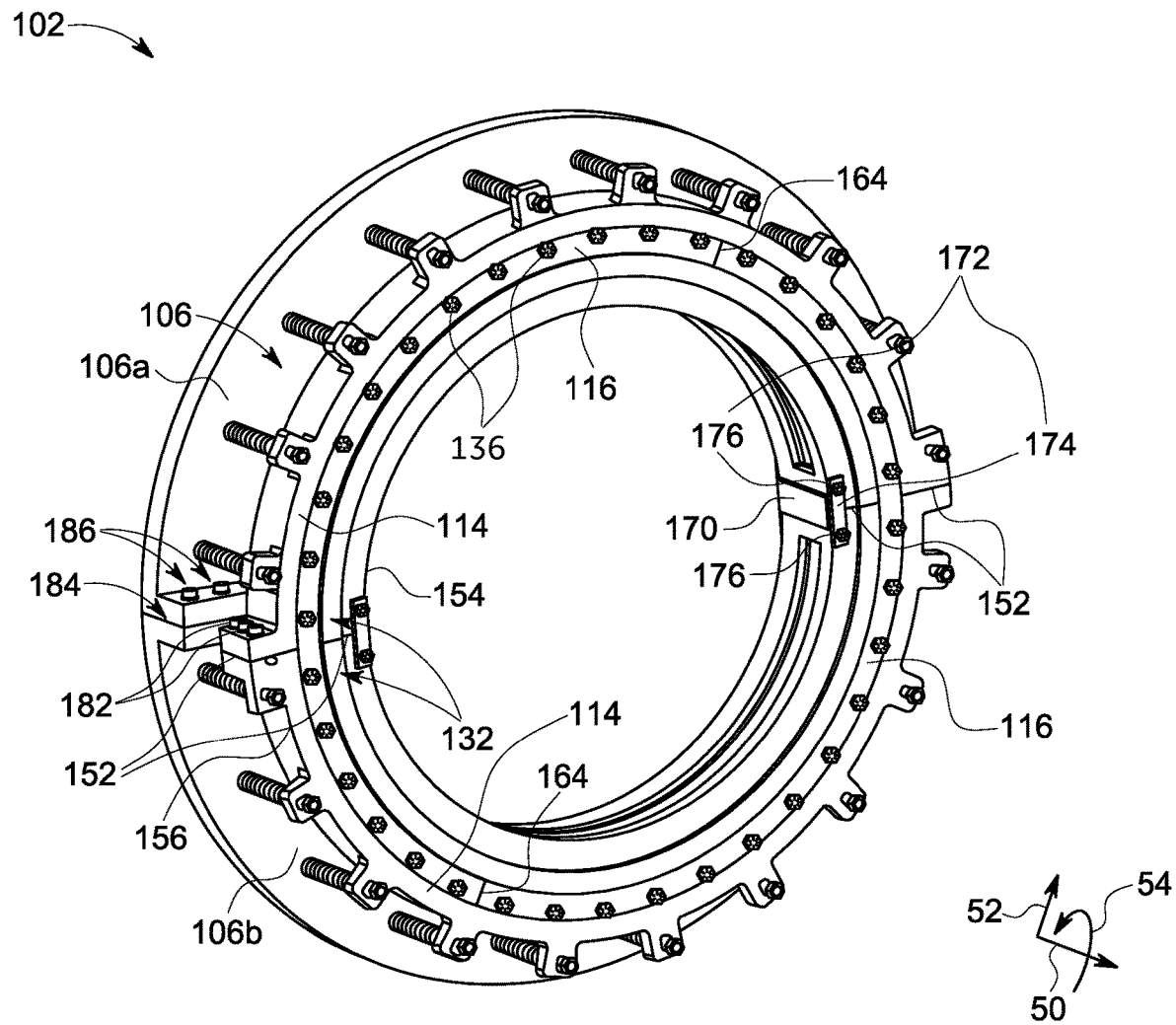
FIG. 5 is a perspective view of an assembled face seal assembly coupled to the stator adaptor of FIGS. 2 and 4, in accordance with aspects of the present technique.

In one embodiment, the plurality of joints 152 is further coupled with one another on the second side portion 156 using a bolted mechanism. In the illustrated embodiment, the bolted mechanism includes a plurality of retaining bolts 182 (as shown in FIG. 5) and a plurality of through-holes 181. In such an embodiment, the plurality of retaining bolts 182 may be used for coupling the plurality of joints 152. Specifically, the plurality of retaining bolts 182 may be disposed within the plurality of the through-holes 181 for coupling the plurality of joints 152.

In one embodiment, the face seal assembly 102 further includes a plurality of coupling members 136. In the illustrated embodiment, each of the plurality of coupling members 180 is an axial bolt. In one or more embodiments, each of the plurality of coupling members 136 is configured to be clamped in the corresponding first groove 163 and the second groove 168, to retain the second segmented seal ring 116 within the circumferential slot 128 of the first segmented seal ring 114.

In one or more embodiments, the split configuration of the first segmented seal ring 114 and the second segmented seal ring 116 enables the use of the face seal assembly 102 with large length-scaled turbines (e.g., steam turbines 36). Specifically, the split configuration allows the face seal assembly 102 to be assembled directly at any desired axial location of the rotor 40 instead of having to slide the face seal assembly 102 from one end of the rotor 40, which may not be possible in large diameter turbines due to interference with other turbine members, such as, end couplings and the like. This is one of the major advantages offered by the split ring design of the first segmented seal ring 114 and the second segmented seal ring 116.

FIG. 5 shows a perspective view of an assembled face seal assembly 102 of FIGS. 2 and 4 in accordance with one exemplary embodiment of the present technique. In one embodiment, the assembled face seal assembly 102 includes the second segmented seal ring 116 disposed at least partly within the circumferential slot 128 (as shown in FIGS. 2 and 4) defined by the first segmented seal ring 114. In such embodiments, the mating face 160 (as shown in FIG. 4) of the circumferential slot 128 is in contact with the opposing mating face 166 (as shown in FIG. 4) of the second segmented seal ring 116. Further, the plurality of joints 152 is circumferentially offset from the plurality of segment ends 164 to reduce the axial step along the seal bearing face 132. In one embodiment, the term "offset" may refer to disposing (or clocking) the plurality of joints 152 and the plurality of segment ends 164 at a first predefined angle and a second predefined angle, respectively relative to the central line axis 26 (as shown in FIG. 2) of the steam turbine. In such embodiments, the first predefined angle is different than the second predefined angle. In the illustrated embodiment, the first predefined angle may be about 0 degree to about 180 degrees and the second predefined angle may be about 30 degrees to about 210 degrees. Essentially, at the joints 152, the mating face 160 of the two first segments 114a, 114b are pushed by the opposing mating face 166 of the second segment 116b. The flatness of the opposing mating face 166 of the second segment 116b ensures that the two first segments 114a, 114b are co-planarly aligned, thereby removing an axial step 888 (as shown in FIG. 4) on the seal bearing face. Similarly, at the segment ends 164, the opposing mating face 166 of the two second segments 116a, 116b are pushed by the mating face 160 of the first segment 114b. The flatness of the mating face 160 of the first segment 114b ensures that the two second segments 116a, 116b are co-planarly aligned. Overall, the two sets of first segments 114a, 114b and second segments 116a, 116b are collectively aligned to one another due to a combination of flat-contacting surfaces 160, 166 respectively and clocking (i.e., offset) of the joints 152 and segment ends 164.

Further, in the offset position, the second segmented seal ring 116 is coupled to the first segmented seal ring 114 using the plurality of coupling members 136, such as, the axial bolts. Specifically, each of the plurality of coupling members 136 is clamped in the corresponding first groove 163 (as shown in FIG. 4) and the second groove 168 respectively, to retain the second segmented seal ring 116 within the circumferential slot 128 of the first segmented seal ring 114.

In one embodiment, at the first side portion 154 of the plurality of joints 152, the plurality of slots 158 (as shown in FIG. 4), the plurality of clamps 170, and the plurality of coupling members 172 are configured to reinforce or fasten the joining ends of each of the plurality of joints 152 to increase rigidity and reduce deformation of the first segmented seal ring 114. Specifically, each of the plurality of clamps 170 is coupled to the plurality of slots 158. Further, each of the plurality of retaining plates 174 is disposed over a side portion 178 (as shown in FIG. 4) of each clamp 170 and the plurality of retaining bolts 176 is clamped to each of the plurality of retaining plates 174 to secure the joining ends of each of the plurality of joints 152.

Similarly, at the second side portion 156 of the plurality of joints 152, each of the plurality of joints 152 is coupled to each other using a plurality of retaining bolts 182. The stator adaptor 106 also includes a plurality of segments 106a, 106b, which are coupled to each other at the segments joints 184 using a plurality of adaptor split line bolts 186.

Typically, machining imperfections and assembly of segments of the first and second segmented seal rings 114, 116 may result in the axial step 888 or discontinuity, as shown in FIG. 4, on the seal bearing face 132. Generally, the axial step 888 along the seal bearing face 132 is undesirable. As described earlier, the hydrodynamic face seal assembly or the hydrostatic face seal assembly operate with a fluid-film having a thickness in a range from about 3 microns to 20 microns separating the seal bearing face 132 and the rotor bearing face 112. If the axial step 888 is comparable in magnitude to the fluid-film thickness, it may lead to poor thin fluid-film characteristics at the face seal clearance 104, thereby resulting in insufficient opening force at the face seal clearance 104, and failure of face seal assembly 102 due to contact between the first segmented seal ring 114 and the rotor ring 110. Overall, the axial step 888 of less than 10 percent of the nominal fluid-film thickness is desirable. Further, the lower rigidity of the face seal assembly 102 is undesirable because due to substantially high-pressure loads, the face seal assembly 102 may deform with out-of-plane of the seal bearing face 132, thereby distorting the seal bearing face 132. A distorted seal bearing face 132 may have poor fluid-film characteristics at the face seal clearance 104, that may lead to seal failure due to contact between the first segmented seal ring 114 and the rotor bearing face. Thus, the present technique discussed herein minimizes the axial step or discontinuity at the seal bearing face 132, and consecutively improves the rigidity of the first segmented seal ring 114 of the face seal assembly 102, thereby reducing deformation of the first segmented seal ring 114.

Figure 6:
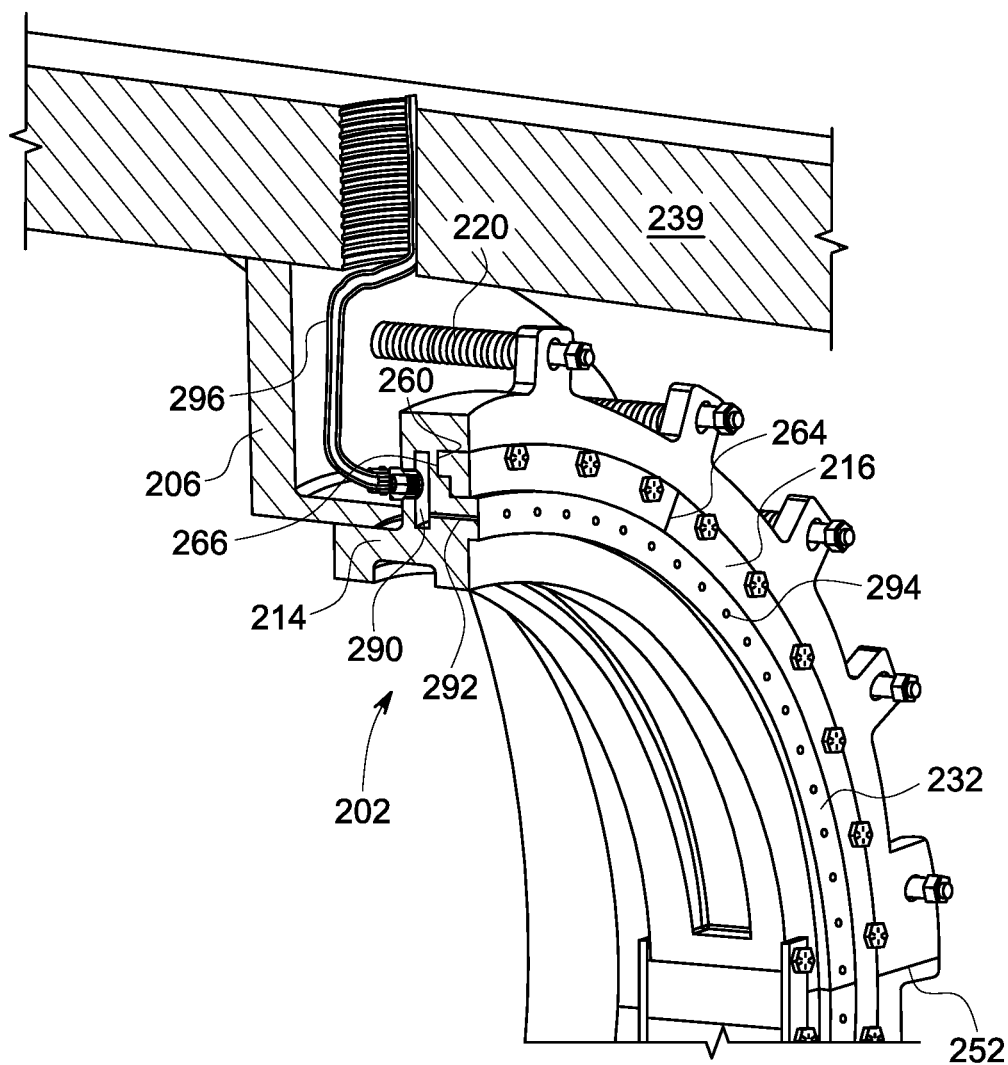
FIG. 6 is a schematic sectional view of a portion of a stator and a face seal assembly, in accordance with aspects of the present technique.

FIG. 6 shows a schematic sectional view of a portion of a stator 239 and a face seal assembly 202 of a turbomachine in accordance with another exemplary embodiment of the present technique. In one embodiment, the face seal assembly 202 includes a first segmented seal ring 214 and a second segmented seal ring 216. The first segmented seal ring 214 includes a plurality of joints 252, a seal bearing face 232, and a first flat-contact surface 260. The first segmented seal ring 214 is coupled to a stator adaptor 206 via a plurality of biasing members 220 and defines a face seal clearance between a rotor bearing face (not shown) and the seal bearing face 232. The second segmented seal ring 216 includes a plurality of segment ends 264 and a second flat-contact surface 266. The second segmented seal ring 216 is coupled to the first segmented seal ring 214 such that the second flat-contact surface 266 is in contact with the first flat-contact surface 260 and the plurality of segment ends 264 is circumferentially offset from the plurality of joints 252. The first segmented seal ring further includes a cavity 290 and a plurality of isolated hydrostatic ports 292 extending from the cavity 290 to the seal bearing face 232. Each isolated port of the plurality of isolated hydrostatic ports 292 includes an opening of a plurality of openings 294 disposed on the seal bearing face 232. The turbomachine further includes a fluid supply tube 296 coupled to the cavity 290 and to a fluid source (not shown). In one embodiment, the fluid source may be disposed outside the turbomachine and the fluid supply tube 296 may extend through the stator 239. In some other embodiment, the fluid supply tube 296 may be coupled to at least one stage of a plurality of stages of the turbomachine, for example, the compressor 12 or the gas turbine 18 (as shown in FIG. 1). During operation, the plurality of isolated hydrostatic ports 292 and the plurality of hydrodynamic elements (as discussed in the embodiment of FIG. 3) may be configured to a produce a fluid-film between a rotor bearing face and the seal bearing face 232, having a substantially larger thickness and stiffness.

Figure 7:
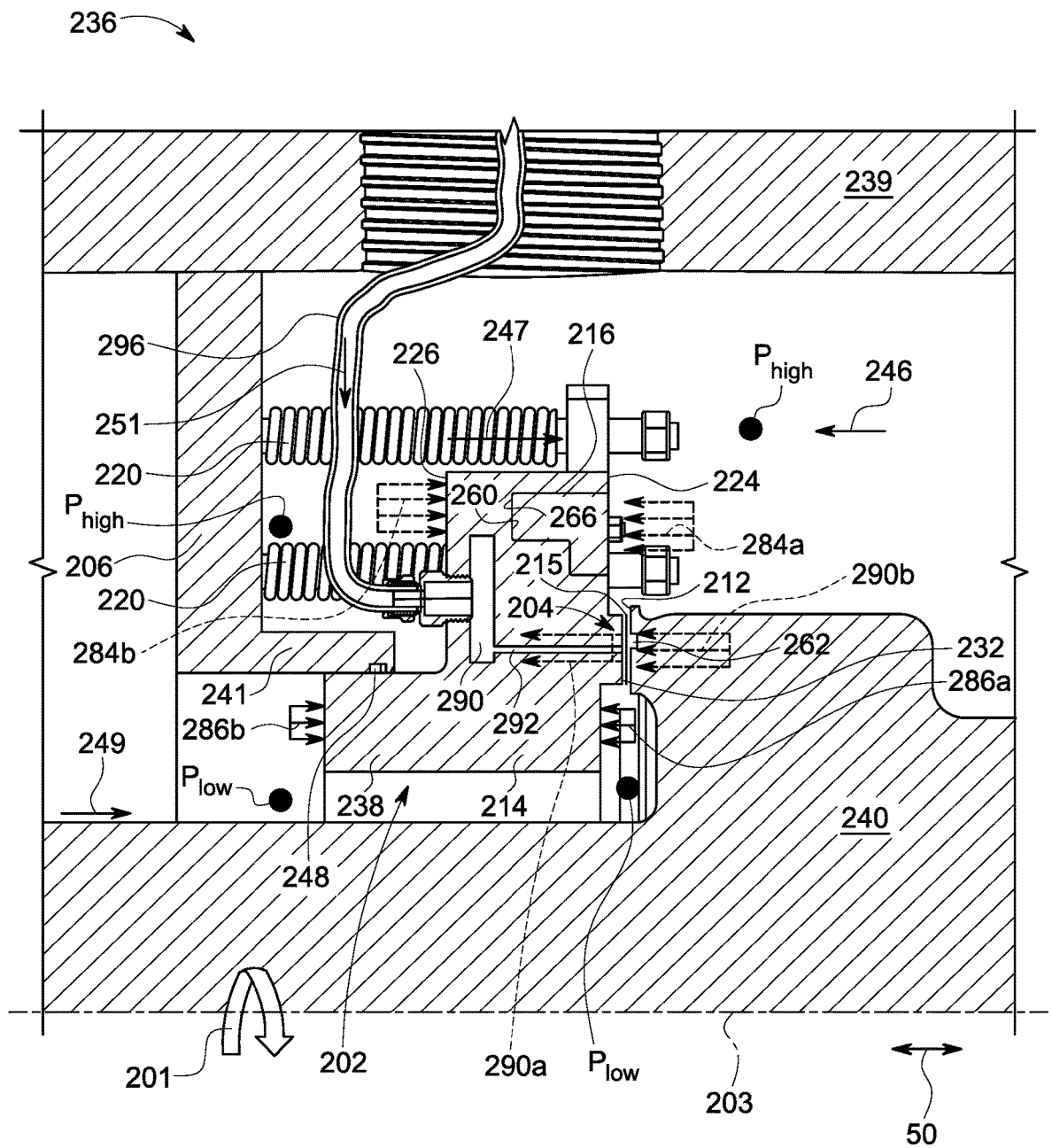
FIG. 7 is a schematic diagram of the turbomachine including the face seal assembly of FIG. 6, in accordance with aspects of the present technique.

FIG. 7 shows a schematic diagram of a turbomachine 236 including the face seal assembly 202 of FIG. 6 in accordance with one exemplary embodiment of the present technique. In one embodiment, the turbomachine 236, for example, a steam turbine includes the stator 239, a rotor 240, and the face seal assembly 202. The stator 239 includes the stator adaptor 206 including an end portion 241. The rotor 240 includes a rotor bearing face 212. The face seal assembly includes the first segmented seal ring 214 and the second segmented seal ring 216. The first segmented seal ring 214 includes a plurality of joints (not shown), a seal bearing face 232, and a first flat-contact surface 260. The second segmented seal ring 216 includes a plurality of segment ends (not shown) and a second flat-contact surface 266.

The first segmented seal ring 214 is slidably coupled to the stator adaptor 206 via a plurality of biasing members 220 and defines a face seal clearance 204 there between the rotor bearing face 212 and a seal bearing face 232. The second segmented seal ring 216 is coupled to the first segmented seal ring 214 such that the second flat-contact surface 266 is in contact with the first flat-contact surface 260. Further, the plurality of segment ends is circumferentially offset from the plurality of joints. The first segmented seal ring 214 further includes an end portion 238 extending away from the seal bearing face 232. The end portion 241 of the stator adaptor 206 is disposed proximate to the end portion 238 of the first segmented seal ring 214. The rotor bearing face 212 includes a plurality of hydrodynamic elements 262. The first segmented seal ring 214 further includes a cavity 290 and a plurality of isolated hydrostatic ports 292 extending from the cavity 290 to the seal bearing face 232. Specifically, the cavity 290 is disposed within the first segmented seal ring 214. The turbomachine 236 further includes a fluid supply tube 296 connected to the cavity 290, a high-pressure cavity "$P_{high}$", and a low-pressure cavity "$P_{low}$". The high-pressure cavity "$P_{high}$" and the low-pressure cavity "$P_{low}$" are defined between the stator 239, the rotor 240, and the face seal assembly 202. Specifically, the high-pressure cavity "$P_{high}$" is disposed upstream relative to a flow of a process fluid 246 (i.e., a high-pressure fluid or steam) in the turbomachine 236. In one or more embodiments, the cavity 290 is isolated from the first-pressure cavity "$P_{high}$" and the low-pressure cavity "$P_{low}$".

During stationary condition of the rotor 240, the seal bearing face 232 and the rotor bearing face 212 are in contact with each other. The plurality of biasing members 220 is configured to apply a closing force 247 to keep the first segmented seal ring 214 and the rotor 240 in contact with each other. In one or more embodiments, the process fluid 246 in the high-pressure cavity "$P_{high}$" applies a separating force 284a on a first peripheral side 224 of the first segmented seal ring 214 and the process fluid 246 applies a closing force 284b on the second peripheral side 226 of the first segmented seal ring 214. Similarly, a leakage fluid 249 (i.e., a low-pressure fluid) in the low-pressure cavity "$P_{low}$" applies a separating force 286a on the first peripheral side 224 of the first segmented seal ring 214 and the leakage fluid 249 in low-pressure cavity "$P_{low}$" applies a closing force 286b on the second peripheral side 226 of the first segmented seal ring 214. In general, during the stationary condition of the rotor 240, the sum of closing forces 247, 284b, 286b are larger than the sum of separating forces 284a, 286a, thereby resulting in maintaining the first segmented seal ring 214 and the rotor bearing face 212 in contact with a contact force that is equivalent to an imbalance between the closing and separating forces.

Further during operation of the face seal assembly 202, the plurality of isolated hydrostatic ports 292 is configured to inject a pressurized fluid 251 against the rotor bearing face 212 to generate a first separating force 290a for lifting-off the seal bearing face 232 and initiating a fluid-film 215 riding operation of the face seal assembly 202. Subsequently, the rotor 240 is configured to rotate, as shown by reference numeral 201, about an axis 203 of the turbomachine 236 causing a portion of the process fluid 246 and the pressurized fluid 251 to rotate between the sealing faces 212, 232 and thereby increase the pressure of at least one of a portion of the pressurized fluid 251 and the portion of the process fluid 246 along the face seal clearance 204 for altering one or more parameters of the fluid-film 215. Upon rotation of the rotor 240, the plurality of hydrodynamic elements 262 disposed on the rotor bearing face 212 generates a second separating force 290b for lifting-off the seal bearing face 232 further and continuing the fluid-film 215 riding operation of the face seal assembly 202. In certain embodiment, the plurality of isolated hydrostatic ports 292 and the plurality of hydrodynamic elements 262 are configured to generate separating force 290a, 290b to lift-off the seal bearing face 232 and thereby increase thickness and stiffness of the fluid-film 215.

In another embodiment, during operation of the face seal assembly 202, the rotor 240 is configured to rotate, as shown by reference numeral 201, about the axis 203 of the turbomachine 236 causing the portion of the process fluid 246 and the pressurized fluid 251 to rotate in the face seal clearance 204. Upon rotation of the rotor 240, the plurality of hydrodynamic elements 262 is configured to generate the first separating force 290b for lifting-off the seal bearing face 232 and initiating the fluid-film 215 riding operation of the face seal assembly 202. Subsequently, the pressurized fluid 251 is injected via the plurality of isolated hydrostatic ports 292 against the rotor bearing face 212 to generate the second separating force 290a for further lift-offing the seal bearing face 232 and continuing the fluid-film 215 riding operation of the face seal assembly 202. It should be noted herein that the terms "first separating force" and "second separating force" may be used interchangeably without deviating from the scope of the present disclosure.

In certain embodiments, the face seal assembly 202 may include the plurality of hydrodynamic elements 262 and may not include the plurality of isolated hydrostatic ports 292. In such an embodiment, the plurality of hydrodynamic elements 262 and the rotation of the rotor 240 are used to generate the separating force 290b and thereby lift-off the seal bearing face 232 and generate the fluid-film 215 there between the seal bearing face 232 and the rotor bearing face 212. In certain other embodiments, the face seal assembly 202 may include only the plurality of isolated hydrostatic ports 292 and may not include the plurality of hydrodynamic elements 262. In such an embodiment, the plurality of isolated hydrostatic ports 292 is used to generate the separating force 290a and thereby lift-off the seal bearing face 232 and generate the fluid-film 215 there between the seal bearing face 232 and the rotor bearing face 212.

The fluid-film produced in the face seal clearance 204 is configured to regulate a leakage flow of the process fluid 246 from the high-pressure cavity "$P_{high}$" to the low-pressure cavity "$P_{low}$". The sealing component 248 is configured to regulate the leakage flow of the process fluid 246 from the high-pressure cavity "$P_{high}$" to the low-pressure cavity "$P_{low}$". In certain embodiments, the sealing component 248 is further configured to provide a sliding interface between the stator adaptor 206 and the first segmented seal ring 214 such that the face seal assembly 202 can move only along the axial direction 50.

Figure 8:
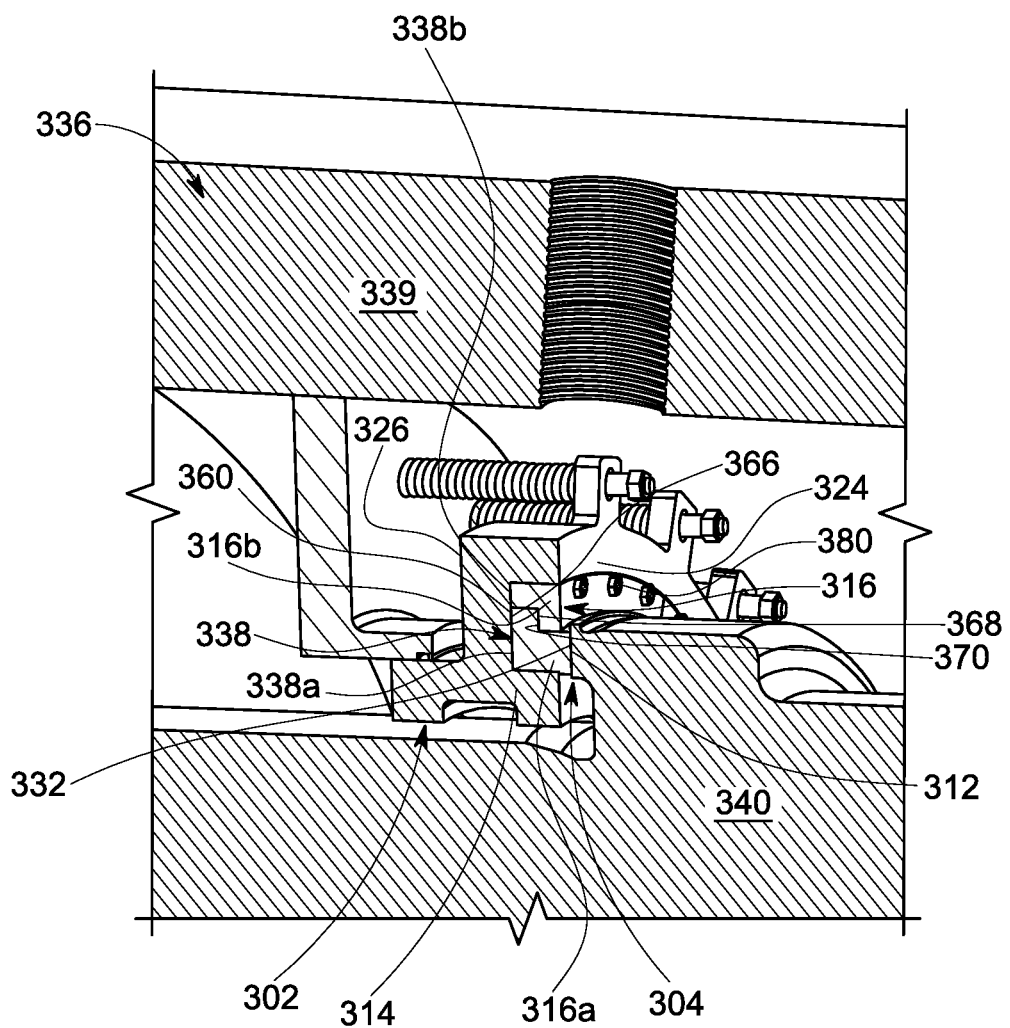
FIG. 8 is a schematic sectional view of a portion of a turbomachine including a stator, a rotor, and a face seal assembly, in accordance with aspects of the present technique.

FIG. 8 shows a schematic sectional view of a portion of a turbomachine, 336 in accordance with another exemplary embodiment of the present technique. The turbomachine 336 includes a stator 339, a rotor 340, and a face seal assembly 302. The rotor 340 includes a rotor bearing face 312. The face seal assembly 302 includes a first segmented seal ring 314 and a second segmented seal ring 316.

In the illustrated embodiment, the first segmented seal ring 314 includes a circumferential slot 338 disposed along a first peripheral side 324 such that the circumferential slot 338 extends inwards from the first peripheral side 324 towards a second peripheral side 326 of the first segmented seal ring 314. In one embodiment, the first segmented seal ring 314 further includes a first flat-contact surface 360. Specifically, the first flat-contact surface 360 is defined within a portion 338a of the circumferential slot 338.

The second segmented seal ring 316 includes a first sub-segmented seal ring 316a and a second sub-segmented seal ring 316b. The first sub-segmented seal ring 316a includes a second flat-contact surface 366, a seal bearing face 332, and a first stepped radial surface 368. Specifically, the seal bearing face 332 and the first stepped radial surface 368 are disposed adjacent to each other and opposite to the second flat-contact surface 366. Similarly, the second sub-segmented seal ring 316b includes a second stepped radial surface 370. The first sub-segmented seal ring 316a and the second sub-segmented seal ring 316b has a mutually complementary profile. The first sub-segmented seal ring 316a is disposed within the portion 338a of the circumferential slot 338 such that the second flat-contact surface 366 is in contact with the first flat-contact surface 360. Further, the second sub-segmented seal ring 316b is disposed within another portion 338b of the circumferential slot 338 such that the second stepped radial surface 370 is in contact with the first stepped radial surface 368. The second sub-segmented seal ring 316b is further coupled to the first segmented seal ring 314. Specifically, the face seal assembly 302 includes a plurality of coupling members 380, for example, a plurality of axial bolts to clamp the second sub-segmented seal ring 316b to the first segmented seal ring 314. Further, the first segmented seal ring 314 includes a plurality of joints (not shown), which are circumferentially offset from a plurality of segment ends of the first sub-segmented seal ring 316a (not shown).

The first sub-segmented seal ring 316a includes the seal bearing face 332. The first sub-segmented seal ring 316a is disposed within the portion 338a of the circumferential slot 338 such that the seal bearing face 332 is disposed facing the rotor bearing face 312. In the illustrated embodiment, the first segmented seal ring 314 is slidably coupled to the stator 339 and defines a face seal clearance 304 between the rotor bearing face 312 and the seal bearing face 332. In one or more embodiment, the first flat-contact surface 360 and the second flat-contact surface 366 are in contact with other, and the plurality of joints is circumferentially offset from the plurality of segment ends to reduce an axial step along the seal bearing face 332 of the first sub-segmented seal ring 316a. In one embodiment, the first sub-segmented seal ring 316a includes a first material and the second sub-segmented seal ring 316b includes a second material different from the first material. Further, the first segmented seal ring 314 may include a third material, which may be different from the first and second materials. In some embodiments, the first, second, and third materials may be a same material. Similar to embodiments shown in FIGS. 4 and 5, the segmented seal rings 314, 316 may be coupled to one another using suitable coupling members 380. Further, the first and second segmented seal rings 314, 316 may be of dissimilar materials. Choosing dissimilar materials for the first and second segmented seal rings 314, 316 allow the seal cross-section to deform differently under thermal loads, thereby allowing the designer/user/operator to control or optimize deformation of the seal bearing face 332. Similar to the embodiments of FIGS. 2-5, the face seal assembly 302 is configured to generate separating forces to lift-off the seal bearing face 332 and thereby increase thickness and stiffness of a fluid-film formed there between the seal bearing face 332 and the rotor bearing face 312.

Figure 9:
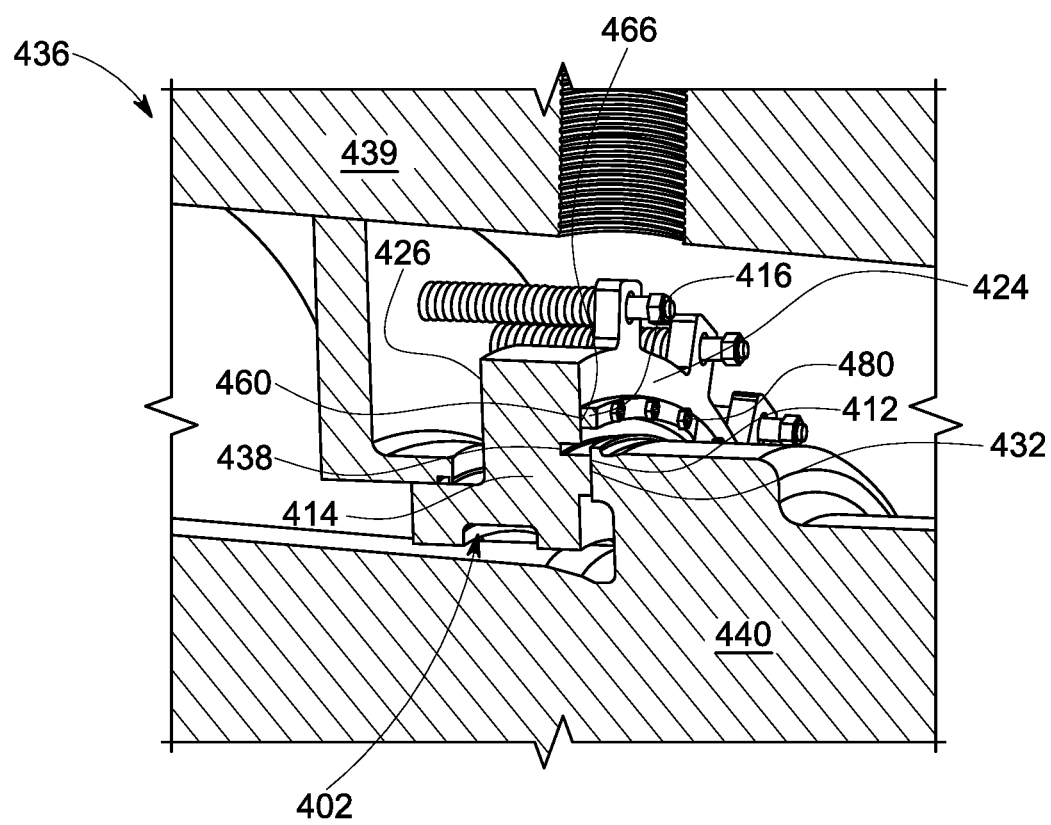
FIG. 9 is a schematic sectional view of a portion of a turbomachine including a stator, a rotor, and a face seal assembly, in accordance with aspects of the present technique.

FIG. 9 shows a schematic sectional view of a portion of a turbomachine, 436 in accordance with yet another exemplary embodiment of the present technique. In yet another embodiment, the turbomachine 436 includes a stator 439, a rotor 440, and a face seal assembly 402. The rotor 440 includes a rotor bearing face 412. The face seal assembly 402 includes a first segmented seal ring 414 and a second segmented seal ring 416.

In the illustrated embodiment, the first segmented seal ring 414 includes a circumferential slot 438 extending from the first peripheral side 424 towards the second peripheral side 446. The first segmented seal ring 414 includes a seal bearing face 432 disposed outside the circumferential slot 438, specifically radially inwards of the circumferential slot 438. The first segmented seal ring 414 further includes a first flat-contact surface 460 (i.e., a flat mating face) disposed outside the circumferential slot 438, specifically radially outwards of the circumferential slot 438. The second segmented seal ring 416 includes a second flat-contact surface 466 (i.e., an opposing flat mating face) disposed along a peripheral side. In such an embodiment, the second segmented seal ring 416 is disposed adjacent the circumferential slot 438 such that the second flat-contact surface 466 is in contact with the first flat-contact surface 460 to reduce the axial step along the seal bearing face. Further, the first segmented seal ring 414 includes a plurality of joints (not shown), which are circumferentially offset from a plurality of segment ends (not shown) of the second segmented seal ring 416. In certain embodiments, the second segmented seal ring 416 interfaces with the first segmented seal ring 414 radially outwards the circumferential slot. In such an embodiment, the first and second segmented seal rings 414, 416 are coupled to each other with a plurality of coupling members 480. In one embodiment, the first segmented seal ring 414 and the second segmented seal ring 416 may be made of identical material or dissimilar materials. Similar to the embodiments of FIGS. 2-5, the face seal assembly 402 is configured to generate separating forces to lift-off the seal bearing face 432 and thereby increase thickness and stiffness of a fluid-film formed there between the seal bearing face 432 and the rotor bearing face 412.

Figure 10:
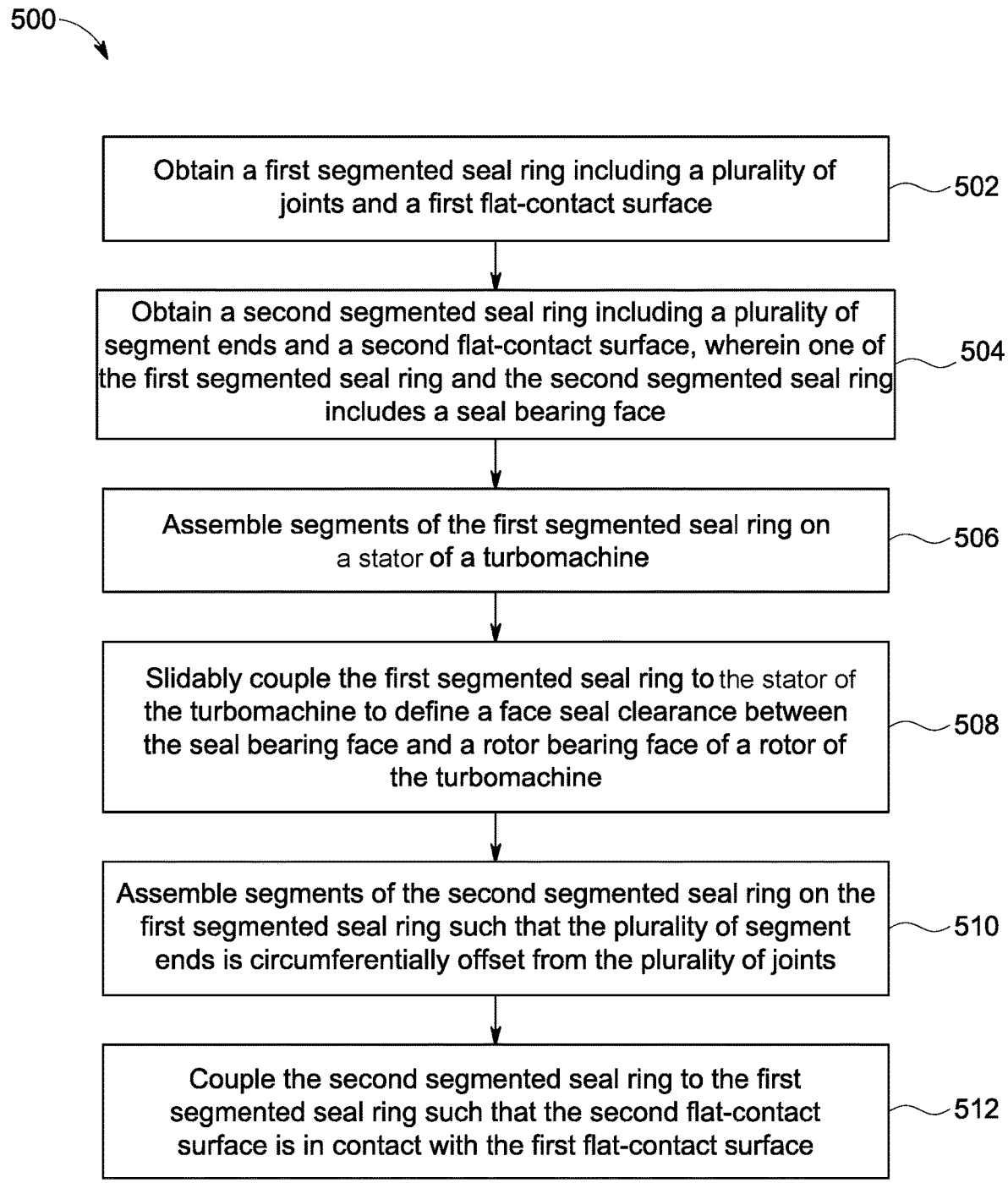
FIG. 10 a flow diagram of a method for fabricating and assembling a face seal assembly in a turbomachine, in accordance with aspects of the present technique.

FIG. 10 is a flow diagram of a method 500 for fabricating and assembling a face seal assembly in a turbomachine in accordance with one exemplary embodiment of the present technique. In one embodiment, the method 500 includes a step 502 of obtaining a first segmented seal ring including a plurality of joints and a first flat-contact surface. Further, the method 500 includes a step 504 of obtaining a second segmented seal ring including a plurality of segment ends and a second flat-contact surface.

In one embodiment, the step 502 of obtaining or receiving the first segmented seal ring includes machining a first seal ring (i.e. a first non-segmented seal ring) to form a circumferential slot in the first non-segmented seal ring. In one embodiment, the circumferential slot is disposed along a portion of a first peripheral side of the first non-segmented seal ring, such that the circumferential slot extends from the first peripheral side towards a second peripheral side of the first non-segmented seal ring. The method further includes a step of machining a surface defined within the circumferential slot to form first flat-contact surface (i.e., a flat mating face). The step of machining the surface of the circumferential slot includes performing grinding or grinding or lapping or polishing the surface of the circumferential slot. In one embodiment, the method includes machining another portion of the first peripheral surface of the first non-segmented ring to generate a seal bearing face. In other words, the seal bearing face is disposed adjacent to the circumferential slot. Specifically, the seal bearing face is disposed radially inwards the circumferential slot. In one embodiment, the step 504 of obtaining or receiving the second segmented seal ring includes machining a second seal ring (i.e. a first non-segmented seal ring) to obtain a second flat-contact surface (i.e., an opposing mating face). The step of machining the second non-segmented seal ring includes performing grinding or lapping or polishing a surface of the second non-segmented seal ring. In one embodiment, the mating face and opposing mating face may be machined to form a substantially flat surface. In some embodiments, the method includes machining a surface of the second non-segmented seal ring to generate a seal bearing face. Furthermore, the first non-segmented ring is split into at least two segments to form a first segmented seal ring including a plurality of joints. Similarly, the second non-segmented ring is split into at least two segments to form a second segmented ring including a plurality of segment ends.

The method 500 includes a step 506 of assembling segments of the first segmented seal ring on a stator of a turbomachine. The method 500 further includes a step 508 of slidably coupling the first segmented seal ring to the stator of the turbomachine to define a face seal clearance between the seal bearing face and a rotor bearing face of a rotor of the turbomachine.

The method 500 further includes a step 510 of assembling segments of the second segmented seal ring on the first segmented seal ring such that the plurality of segment ends is circumferentially offset from the plurality of joints. Specifically, the step 510 includes disposing the second segmented seal ring within the circumferential slot. The method 500 further includes a step 512 of coupling the second segmented seal ring to the first segmented seal ring via a plurality of coupling members, such that the second flat-contact surface is in contact with the first flat-contact surface. In one embodiment, the plurality of coupling members may include a plurality of axial bolts. In one or more embodiments, an axial step along the seal bearing face of the first segmented seal ring is reduced by positioning the plurality of segment ends circumferentially offset from the plurality of joints and contacting the second flat-contact surface with the first flat-contact surface.

In one or more embodiments, the method further includes a step of coupling each joint of the plurality of joints using a plurality of coupling devices to increase rigidity of the face seal assembly and reduce deformation of the first segmented seal ring. In such embodiments, the plurality of coupling devices may include a plurality of slots, a plurality of clamps, a plurality of retaining plates, and a plurality of retaining bolts.

In certain embodiments, upon detection of axial step along the seal bearing surface, the method 500 may include a step of de-coupling the second segmented seal ring from the first segmented seal ring and a step of de-assembling segments of the first segmented seal ring from the rotor. In such an embodiment, the method 500 may include a step of re-machining at least one of the first flat-contact surface and the second flat-contact surface. In certain embodiments, the method 500 may further include a step of machining the seal bearing surface.

Further, the method includes a step of re-assembling segments of the first segmented seal ring over the rotor and redisposing the second segmented seal ring within the circumferential slot of the first segmented seal ring such that the plurality of joints is circumferentially offset from the plurality of segment ends. The method further includes a step of re-coupling the second segmented seal ring to the first segmented seal ring using the plurality of coupling members.

In certain embodiments, re-disposing the second segmented seal ring within the circumferential slot and re-coupling the second segmented seal ring to the first segmented seal ring may include re-contacting the mating face with the opposing mating face to reduce the axial step along the seal bearing face. In such an embodiment, the first flat-contact surface and the second flat-contact surface include a substantially flat surface. In one or more embodiments, the term "flat surface" means a surface having a levelled surface or smooth surface extending along one plane, for example, radially without having raised areas or indentations along the surface.

In another embodiment, the step 502 of obtaining or receiving the first segmented seal ring includes receiving a first seal ring and machining a portion of the first seal ring to form a circumferential slot extending inwards from a first peripheral side towards a second peripheral side of the first seal ring. The step 502 further includes machining a portion of a surface of the first seal ring to form the first flat-contact surface. Specifically, the first flat-contact surface is located radially outwards the circumferential slot. In such an embodiment, the step 502 further includes machining another portion of the surface of the first seal ring to form a seal bearing surface. Specifically, the seal bearing surface is located radially inwards the circumferential slot. The step 502 further includes splitting the first seal ring to generate the first segmented seal ring including a plurality of joints.

In one embodiment, the step 504 of obtaining or receiving the second segmented seal ring includes machining a surface of a second seal ring to form the second flat-contact surface and splitting the second seal ring to generate the second segmented seal ring including a plurality of segment ends. In such an embodiment, the step 510 of assembling segments of the second segmented seal ring and step 512 of coupling the second segmented seal ring to the first segmented seal ring include disposing the second segmented seal ring radially outwards the circumferential slot and coupling to the first segmented seal ring.

In yet another embodiment, the step 502 of obtaining or receiving the first segmented seal ring includes machining a portion of a first seal ring to form a circumferential slot extending inwards from a first peripheral side towards a second peripheral side of the first seal ring. Further, the step 502 includes machining a portion of a surface defined within the circumferential slot to form the first flat-contact surface. The step 502 further includes splitting the first seal ring to generate the first segmented seal ring including a plurality of joints. In one embodiment, the step of 504 of obtaining or receiving the second segmented seal ring includes receiving a second seal ring including a first sub seal ring and a second sub seal ring. Further, the step 504 includes machining a surface of the first sub seal ring to form a second flat-contact surface. The step 504 further includes machining another surface of the first sub seal ring to form a seal bearing surface. In such embodiments, the first sub seal ring includes a first stepped radial surface disposed adjacent the seal bearing face and opposite the second flat-contact surface. The second sub seal ring includes a second stepped radial surface. The step 504 further includes splitting the first sub seal ring to generate a first sub-segmented seal ring including a plurality of segment ends and the second sub seal ring to generate a second sub-segmented seal ring. The step 510 of assembling segments of the second segmented seal ring includes disposing the first sub-segmented seal ring within the portion of the circumferential slot such that the second flat-contact surface is in contact with the first flat-contact surface and disposing the second sub-segmented seal ring within other portion of the circumferential slot such that the second stepped radial surface is in contact with the first stepped radial surface. The step 512 of coupling the second segmented seal ring to the first segmented seal ring includes coupling the second sub-segmented seal ring to the first segmented seal ring.

In one or more embodiments, the method 500 further includes machining one of the seal bearing face and the rotor bearing face to form a plurality of hydrodynamic elements. In such an embodiment, the plurality of hydrodynamic elements is spaced apart from each other along a circumferential direction of the turbomachine. In one or more embodiments, at least one hydrodynamic elements of the plurality of hydrodynamic elements includes a spiral groove, Rayleigh steps, and the like. The method 500 further includes machining the first segmented seal ring to form a plurality of isolated hydrostatic ports. In such an embodiment, the plurality of isolated hydrostatic ports is spaced apart from each other and extending from a cavity formed within the first segmented seal ring, to the seal bearing face. The method 500 further includes clamping corresponding ends of the plurality of joints of the plurality of first segmented seal ring, using at least one coupling device of a plurality of coupling devices.

In one embodiment, the present technique allows machining of segmented seal rings in a separate machining process and then in-situ assembling the segmented seal rings on a relatively large sized rotor without the need to perform in-situ machining of the segmented seal rings in the rotor, to minimize the axial step on the bearing face. In one or more embodiments, the ability to in-situ assemble split segments of the first and second segmented seal rings allows usage of such a face seal assembly for a large-scale turbine, where traditional non-split seal ring (or a 360-degree stator ring) may not be assembled due to interference with other components, such as end couplings, of the large-scale turbine.

Advantageously, in accordance with one or more embodiments discussed herein, a face seal assembly reduces an axial step along a bearing surface of a split face seal assembly and increases rigidity of a split face seal assembly. In one embodiment, a mating face of a circumferential slot is in contact with an opposite mating face of a second segmented seal ring to reduce the axial step along the bearing face. In such embodiments, the mating face and the opposite mating face have a flat surface. Further, a plurality of joints is offset from a plurality of segment ends to reduce the axial step along the bearing face. In one embodiment, each of the plurality of joints is coupled to each other using a plurality of coupling members and a plurality of clamps to reinforce the joining ends of each of the plurality of joints, thereby increasing the rigidity of the face seal assembly and reducing deformation of the first segmented seal ring.

While only certain features of embodiments have been illustrated and described herein, many modifications and changes will occur to those skilled in the art. It is, therefore, to be understood that the appended claims are intended to cover all such modifications and changes as falling within the spirit of the invention.

The invention claimed is:

1. A turbomachine comprising:
a stator;
a rotor comprising a rotor bearing face; and
a face seal assembly comprising:
a first segmented seal ring comprising a plurality of joints and a first flat-contact surface; and
a second segmented seal ring comprising a plurality of segment ends and a second flat-contact surface,
wherein one of the first segmented seal ring and the second segmented seal ring comprises a seal bearing face, wherein the second segmented seal ring is coupled to the first segmented seal ring such that the second flat-contact surface is in contact with the first flat-contact surface, wherein the plurality of segment ends is circumferentially offset from the plurality of joints, and wherein the first segmented seal ring is slidably coupled to the stator and defines a face seal clearance between the rotor bearing face and the seal bearing face.

2. The turbomachine of claim 1, wherein the first segmented seal ring further comprises a circumferential slot extending inwards from a first peripheral side towards a second peripheral side of the first segmented seal ring and facing the rotor bearing face.

3. The turbomachine of claim 2, wherein the first flat-contact surface is defined within the circumferential slot, and wherein the second segmented seal ring is disposed within the circumferential slot and coupled to the first segmented seal ring.

4. The turbomachine of claim 2, wherein the second segmented seal ring further comprises a first sub-segmented seal ring and a second sub-segmented seal ring.

5. The turbomachine of claim 4, wherein the first sub-segmented seal ring comprises the second flat-contact surface and a first stepped radial surface, wherein the first stepped radial surface is disposed opposite to the second flat-contact surface, and wherein the second sub-segmented seal ring comprises a second stepped radial surface.

6. The turbomachine of claim 5, wherein the first flat-contact surface is defined within a portion of the circumferential slot, and wherein the first sub-segmented seal ring is disposed within the portion of the circumferential slot such that the second flat-contact surface is in contact with the first flat-contact surface.

7. The turbomachine of claim 6, wherein the second sub-segmented seal ring is disposed within another portion of the circumferential slot such that the second stepped radial surface is in contact with the first stepped radial surface, and wherein the second sub-segmented seal ring is coupled to the first segmented seal ring.

8. The turbomachine of claim 7, wherein the first sub-segmented seal ring comprises a first material and the second sub-segmented seal ring comprises a second material different from the first material.

9. The turbomachine of claim 2, wherein the first flat-contact surface is defined radially outwards the circumferential slot, and wherein the second segmented seal ring is disposed radially outwards the circumferential slot and coupled to the first segmented seal ring.

10. The turbomachine of claim 1, wherein the first segmented seal ring comprises a first material and the second segmented seal ring comprises a second material different from the first material.

11. The turbomachine of claim 1, wherein one of the rotor bearing face and the seal bearing face comprises a plurality of hydrodynamic elements disposed spaced apart from each other along a circumferential direction of the turbomachine.

12. The turbomachine of claim 1, wherein the first segmented seal ring further comprises a cavity and a plurality of isolated hydrostatic ports extending from the cavity to the seal bearing face.

13. The turbomachine of claim 12, further comprising a fluid supply tube coupled to the cavity and configured to supply a pressurized fluid to the cavity.

14. The turbomachine of claim 1, further comprising a plurality of coupling devices comprising at least one of a plurality of slots, a plurality of clamps, a plurality of retaining plates, and a plurality of retaining bolts, wherein each coupling device of the plurality of coupling devices is configured to clamp corresponding ends of the plurality of joints.

15. A method of assembling a face seal assembly, comprising:
obtaining a first segmented seal ring comprising a plurality of joints and a first flat-contact surface;
obtaining a second segmented seal ring comprising a plurality of segment ends and a second flat-contact surface, wherein one of the first segmented seal ring and the second segmented seal ring comprises a seal bearing face;
assembling segments of the first segmented seal ring on a stator of a turbomachine;
slidably coupling the first segmented seal ring to the stator of the turbomachine to define a face seal clearance between the seal bearing face and a rotor bearing face of a rotor of the turbomachine;
assembling segments of the second segmented seal ring on the first segmented seal ring such that the plurality of segment ends is circumferentially offset from the plurality of joints; and coupling the second segmented seal ring to the first segmented seal ring such that the second flat-contact surface is in contact with the first flat-contact surface.

16. The method of claim 15, wherein obtaining the first segmented seal ring and the second segmented seal ring comprises:
machining a portion of a first seal ring to form a circumferential slot extending inwards from a first peripheral side towards a second peripheral side of the first seal ring;
machining a surface defined within the circumferential slot to form the first flat-contact surface;
machining a surface of a second seal ring to form the second flat-contact surface; and
splitting the first seal ring to generate the first segmented seal ring and the second seal ring to generate the second segmented seal ring.

17. The method of claim 16, wherein assembling segments of the second segmented seal ring and coupling the second segmented seal ring to the first segmented seal ring comprise disposing the second segmented seal ring within the circumferential slot and coupling to the first segmented seal ring.

18. The method of claim 15, wherein obtaining the first segmented seal ring and the second segmented seal ring comprises:
machining a portion of a first seal ring to form a circumferential slot extending inwards from a first peripheral side towards a second peripheral side of the first seal ring;
machining a portion of a surface located radially outwards the circumferential slot to form the first flat-contact surface;
machining a surface of a second seal ring to form the second flat-contact surface; and
splitting the first seal ring to generate the first segmented seal ring and the second seal ring to generate the second segmented seal ring.

19. The method of claim 18, wherein assembling segments of the second segmented seal ring and coupling the second segmented seal ring to the first segmented seal ring comprise disposing the second segmented seal ring radially outwards the circumferential slot and coupling to the first segmented seal ring.

20. The method of claim 15, wherein obtaining the first segmented seal ring and the second segmented seal ring comprise:
machining a portion of a first seal ring to form a circumferential slot extending inwards from a first peripheral side towards a second peripheral side of the first seal ring;
machining a portion of a surface defined within the circumferential slot to form the first flat-contact surface;
receiving a second seal ring comprising a first sub seal ring and a second sub seal ring;
machining a surface of the first sub seal ring to form a second flat-contact surface, wherein the first sub seal ring comprises a first stepped radial surface disposed opposite to the second flat-contact surface, and wherein the second sub seal ring comprises a second stepped radial surface; and
splitting the first segmented seal ring to generate the first segmented seal ring, the first sub seal ring to generate a first sub-segmented seal ring, and the second sub seal ring to generate a second sub-segmented seal ring.

21. The method of claim 20, wherein assembling segments of the second segmented seal ring and coupling the second segmented seal ring to the first segmented seal ring comprise:
disposing the first sub-segmented seal ring within a portion of the circumferential slot such that the second flat-contact surface is in contact with the first flat-contact surface;
disposing the second sub-segmented seal ring within another portion of the circumferential slot such that the second stepped radial surface is in contact with the first stepped radial surface; and
coupling the second sub-segmented seal ring to the first segmented seal ring.

22. The method of claim 15, further comprising machining one of the seal bearing face and the rotor bearing face to form a plurality of hydrodynamic elements spaced apart from each other along a circumferential direction of the turbomachine.

23. The method of claim 15, further comprising machining the first segmented seal ring to form a plurality of isolated hydrostatic ports spaced apart from each other and extending from a cavity formed within the first segmented seal ring, to the seal bearing face.

24. The method of claim 15, further comprising clamping corresponding ends of the plurality of joints using at least one coupling device of a plurality of coupling devices comprising at least one of a plurality of slots, a plurality of clamps, a plurality of retaining plates, and a plurality of retaining bolts.

* * * * *